Aug. 7, 1951 A. V. LORD 2,563,684

SOUND ON SYNC SEPARATION SYSTEM

Filed July 15, 1946

Inventor

ARTHUR V. LORD

By Emery, Holcombe & Blair

Attorneys

Patented Aug. 7, 1951 2,563,684

UNITED STATES PATENT OFFICE 2,563,684

SOUND ON SYNC SEPARATION SYSTEM

Arthur Valentine Lord, Cambridge, England, assignor to Pye Limited, Cambridge, England, a British company Application July 15, 1946, Serial No. 683,699
In Great Britain July 14, 1945

4 Claims. (Cl. 178—5.8)

Figure 1A:
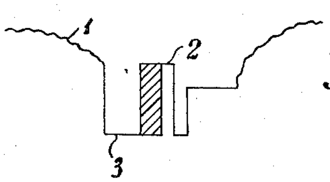

The present invention relates to combined television and sound systems in which the speech or other sound modulation is transmitted as a series of modulated pulses on the same carrier as the picture intelligence and the synchronising signals.

In the arrangement described in British Specification No. 564,511, the sound pulses are transmitted with an amplitude which is greater than the amplitude of the picture intelligence or the synchronising pulses so that they can be separated at the receiver by a simple amplitude limiting arrangement. Although, by making the sound pulses correspond to peak output of the transmitter the separation is facilitated, the arrangement has the disadvantage of producing a white trace on the tube for a part of the line fly-back unless suppression means be employed for blanking off the tube during this period. This is not a difficult matter when designing and constructing a new television receiver but entails modification of all existing television receivers on the market if these receivers are to be used for the reception of combined sound and television programmes transmitted on a single carrier wave as described in British Specification No. 564,511.

If the height of the sound pulse be reduced sufficiently, no cathode ray tube blanking is required but more complex circuits are necessary for separating the sound pulses from the remainder of the waveform.

The present invention has for its object to provide an arrangement for enabling the above disadvantages to be overcome by transmitting the sound pulses during the line synchronising periods with a smaller amplitude so that an undesirable white line will not occur when reproducing the picture on existing television receivers, whilst avoiding complex separating circuits and enabling the separation to be effected by a simple amplitude limiting arrangement in the receiver.

To this end, according to the invention, a series of auxiliary pulses is generated in the receiver corresponding to the line repetition frequency and is mixed with the waveform so that a resulting waveform is produced having the incoming sound pulses standing upon the top edges of the auxiliary pulses. The height of the auxiliary pulses is made such that the tops of the sound pulses are raised above the peak potentials of the picture intelligence and synchronising signals whereby the sound pulses may be easily separated from the remainder of the waveform by a simple amplitude limiting arrangement.

The arrangement, according to the invention, may be applied whether the sound pulses be modulated in width, frequency or phase or whether they be modulated in amplitude. The sound pulses are transmitted within the synchronising pulses and the auxiliary pulses are similarly injected into the waveform during the period of the synchronising pulses. The auxiliary pulses are of greater width than the maximum width of the sound pulses.

The auxiliary pulses may be derived from the existing line time base generator in the television receiver.

In order that the invention may be more clearly understood reference will now be made to the accompanying drawings in which Figure 1*a* shows the incoming waveform, Figure 1*b* the auxiliary waveform and Figure 1c the combined waveform.

Figure 2:
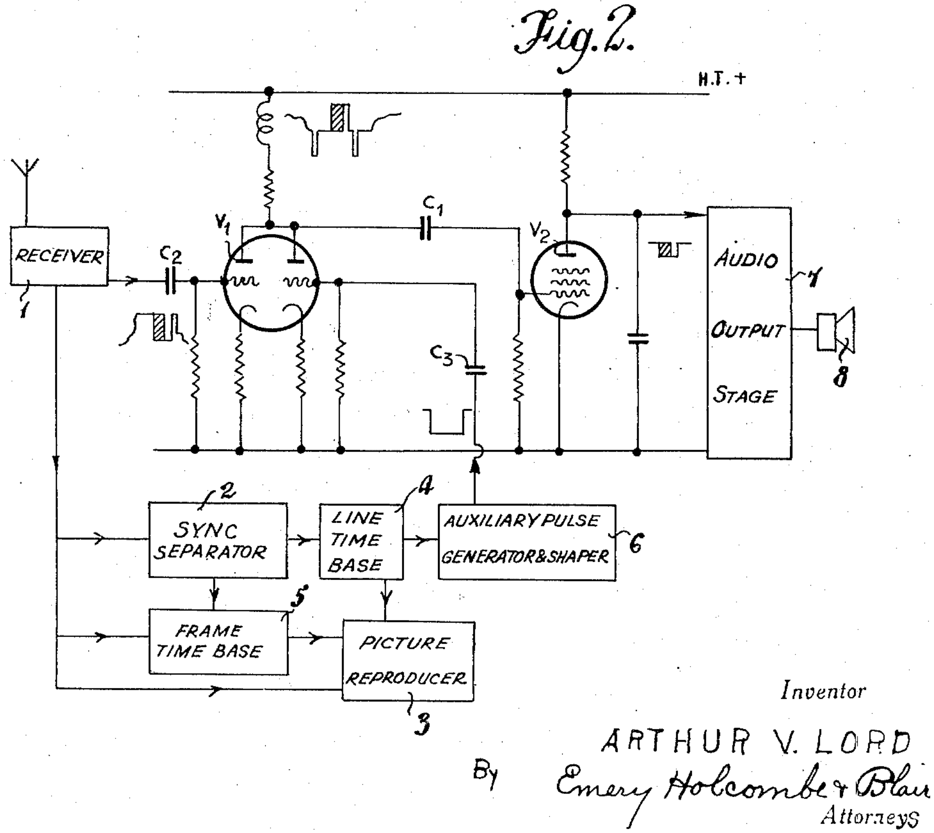

Figure 2 shows a circuit arrangement of a receiver according to the invention.

Referring to Figure 1 of the drawings, the incoming waveform is shown in Fig. 1*a* and comprises the picture intelligence 1 and the modulated sound pulses 2 which are positioned within the line synchronising pulses 3. The sound pulses are indicated as being modulated in width within the limits of the shaded area and are of smaller amplitude than the picture intelligence in order to avoid the necessity of providing special blanking means in the receiver for preventing a white trace on the tube due to the sound pulses during the line fly-back.

Figure 1B:
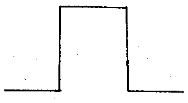

According to the invention, there is mixed with the incoming waveform a series of auxiliary pulses, as shown in Fig. 1*b*, which are positioned in time corresponding to the line synchronising pulses of the incoming waveform and of a duration less than that of the line synchronising pulses, but greater than the sound pulses. The amplitude of these auxiliary pulses is such that in the combined waveform, as shown in Fig. 1c, the sound pulses are raised above the level of the picture intelligence and can therefore be separated by means of a simple amplitude limiting arrangement. The auxiliary pulses are derived from the line time base generator in the television receiver.

Figure 2 shows a circuit arrangement of a television receiver incorporating the novel circuit according to this invention for separating the sound pulses from the picture intelligence and the synchronising pulses. The incoming waveform is received and detected by the receiver 1, the output of which is fed to the synchronising separator 2 and also to the picture reproducer 3.

The synchronising separator 2 separates the line and frame synchronising pulses from the picture intelligence and from one another, the line synchronising pulses being fed to trigger the line time base 4 and the frame synchronising pulses to the frame time base 5. The line time base and the frame time base are connected with the picture reproducing device 3 for controlling the scanning thereof and the reproduction of the picture.

To separate the sound pulses from the picture intelligence and synchronising pulses, the incoming waveform after inversion in the receiver 1, is applied through the condenser C2 to the first grid of a mixing valve V1 comprising two triodes, the anodes of which are connected together and connected through the coupling condenser C1 to the grid of the separator valve V2. An auxiliary pulse waveform comprising pulses having a width less than the width of the line synchronising pulses but greater than the width of the sound pulses is produced in the auxiliary pulse generator and shaper 6 under control of the output from the line time base 4, the auxiliary pulses being produced at such intervals of time that they occur within the synchronising pulse periods and are spaced from both the leading and trailing edges thereof. Suitable circuit arrangements for producing such a pulse are described in United States patent to Schantz, No. 2,459,723, dated January 18, 1949, for Pulse and Square Wave Generator, and can readily be adapted to the requirements of timing and amplitude for mixing with the incoming signals. These auxiliary pulses are mixed with the incoming waveform in the mixing valve V1 by applying the auxiliary pulses in negative phase to the second grid of the valve V1 through the condenser C3.

Figure 1C:
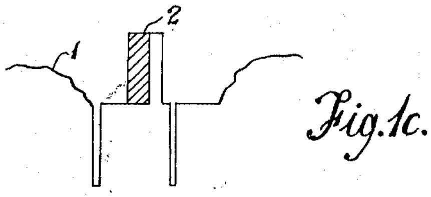

The incoming and auxiliary waveforms are mixed in the valve V1 and the resultant composite waveform in the anode circuit is as shown in Figure 1c with the peaks of the sound pulses raised above the level of the picture intelligence. This composite waveform is passed into the valve V2 which operates with no cathode bias and with a long time constant in the grid circuit. The grid of V2 will be at a negative potential with respect to earth, except during the peaks of the sound pulse periods. V2 will then only conduct during the sound pulse peaks so that only these peaks appear in the output circuit of V2 and are fed to the audio output stage 7 and the loud speaker 8.

Although a particular embodiment of the invention has been described, it will be understood that various modifications may be made without departing from the scope of the invention. For example, the video section of the valve V1 may be operated without the cathode resistor and with a long time constant in the grid circuit. The grid cut-off characteristic will then remove the picture waveform and the peaks of the sound pulses together with interference occurring during the picture period. The resultant composite waveform in the output of V1 would then be of the type shown in Figure 1c except that the picture intelligence would be suppressed. The sound peaks would then be separated from this composite waveform by the valve V2.

I claim:

1. A receiver for receiving a combined sound and television waveform in which the sound pulses occur during the line synchronising periods and have an amplitude less than that of the picture intelligence, comprising means for receiving the incoming waveform, means for feeding the received waveform to a picturer reproducing device, line and frame time bases for controlling the scanning of the picture reproducing device, means for controlling the line and frame time bases by the synchronising pulses of the received waveform, means for deriving from the line time base a series of auxiliary pulses corresponding to the line repetition frequency and having a width less than that of the line synchronising pulse but greater than that of the sound pulses, means for mixing the auxiliary pulses with the incoming waveform to produce a resulting waveform having the incoming sound pulses standing upon the top edges of the auxiliary pulses, the amplitude of the auxiliary pulses being such that they raise the peaks of the sound pulses above the peak potential of the picture intelligence, amplitude limiting means for separating the elevated sound pulses from the picture intelligence, and means for feeding the separated sound pulses to a sound reproducing device.

2. A receiver for receiving a combined sound and television waveform in which the sound pulses occur during the line synchronising periods and have an amplitude less than that of the picture intelligence, comprising means for receiving the incoming waveform, means for feeding the received waveform to a picture reproducing device, line and frame time bases for controlling the scanning of the picture reproducing device, means for controlling the line and frame time bases by the synchronising pulses of the received waveform, means for deriving from the line time base a series of auxiliary pulses corresponding to the line repetition frequency and having a width less than that of the line synchronising pulses but greater than that of the sound pulses, means for mixing the auxiliary pulses with the received waveform in timed relation such that the auxiliary pulses occur within the line synchronising periods and the sound pulses occur within the duration of the auxiliary pulses, the amplitude of the auxiliary pulses being such that the peaks of the sound pulses are raised, in the composite waveform, above the peak amplitude of any other signals in the composite waveform, amplitude limiting means for separating the elevated sound pulses from the remaining signals of the composite waveform, and means for feeding the separated sound pulses to a sound reproducing device.

3. A receiver for receiving a combined sound and television waveform in which the sound pulses occur during the line synchronising periods and have an amplitude less than that of the picture intelligence, comprising means for receiving the incoming waveform, means for feeding the received waveform to a picture reproducing device, line and frame time bases for controlling the scanning of the picture reproducing device, means for controlling the line and frame time bases by the synchronising pulses of the received waveform, means for deriving from the line time base a series of auxiliary pulses of line repetition frequency having a width less than that of the line synchronising pulses but greater than that of the sound pulses, two electronic valves each comprising a cathode, a control grid and an anode, means connecting the anodes of said two valves together, means for feeding the received waveform to the grid of the first of said valves, means for feeding the auxiliary pulses to the grid of the second of said valves, in timed relation with the received waveform such that the auxiliary pulses occur within the line synchronising periods and the sound pulses occur within the duration of the auxiliary pulses, the amplitude of the auxiliary pulses being such that the peaks of the sound pulses are raised in the mixed waveform occurring in the common anode circuit of the two valves above the peak amplitude of any other signals in the composite waveform, means for feeding the output from said anodes to an amplitude limiting means biassed to separate the elevated sound pulses from the remaining signals of the composite waveform, and means for feeding the separated sound pulses to a sound reproducing device.

4. A receiver as claimed in claim 3, wherein the amplitude limiting means comprises a third electronic valve having a cathode, a control grid and an anode, the output from the common anodes of the first two valves being fed to the control grid of the third valve through a capacity, said control grid being connected to earth through a resistor whereby to produce a long time constant in said grid circuit, a direct connection between the cathode of the third valve and earth, and means for connecting the anode of the third valve to the sound reproducing device.

ARTHUR VALENTINE LORD.

REFERENCES CITED

The following references are of record in the file of this patent:

UNITED STATES PATENTS

| Number | Name | Date |
|---|---|---|
| 2,199,634 | Koch | May 7, 1940 |
| 2,212,199 | Browne | Aug. 20, 1940 |
| 2,227,108 | Roosenstein | Dec. 31, 1940 |
| 2,250,708 | Herz | July 29, 1941 |
| 2,266,194 | Guanella | Dec. 16, 1941 |
| 2,268,001 | Farnholz | Dec. 30, 1941 |
| 2,391,776 | Fredendall | Dec. 25, 1945 |
| 2,428,118 | Labin | Sept. 30, 1947 |

FOREIGN PATENTS

| Number | Country | Date |
|---|---|---|
| 564,511 | Great Britain | Oct. 2, 1944 |

OTHER REFERENCES

Journal I. E. E. (Great Britain), page 256, July 1946.